(12) United States Patent
McDonnell

(10) Patent No.: US 6,763,491 B2
(45) Date of Patent: Jul. 13, 2004

(54) METHODS AND SYSTEMS FOR AVOIDING UNNECESSARY RETRANSMISSIONS ASSOCIATED WITH AUTOMATIC RETRANSMISSION QUERY SCHEMES IN RADIOCOMMUNICATION SYSTEMS

(75) Inventor: Neil McDonnell, Dublin (IE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 618 days.

(21) Appl. No.: 09/778,105

(22) Filed: Feb. 7, 2001

(65) Prior Publication Data

US 2002/0108082 A1 Aug. 8, 2002

(51) Int. Cl.⁷ .............................. H04L 1/14; H02H 3/05
(52) U.S. Cl. ......................................... 714/750; 714/18
(58) Field of Search ................................ 714/750, 749, 714/748, 751, 712, 715, 819, 18, 43, 56; 370/313, 346, 347; 455/575, 67.13, 115.1

(56) References Cited

U.S. PATENT DOCUMENTS

| | | | |
|---|---|---|---|
| 5,471,469 A | * 11/1995 | Flammer et al. | ............ 370/346 |
| 5,968,197 A | * 10/1999 | Doiron | ....................... 714/748 |
| 6,058,106 A | 5/2000 | Cudak et al. | |
| 6,529,525 B1 | * 3/2003 | Pecen et al. | ................ 370/469 |
| 6,640,325 B1 | * 10/2003 | Fischer | ...................... 714/748 |

FOREIGN PATENT DOCUMENTS

| WO | WO95/12935 Y | 5/1995 |
|---|---|---|
| WO | WO97/13353 A | 4/1997 |
| WO | WO00/62467 A | 10/2000 |

OTHER PUBLICATIONS

"EN 301349 V6.3.1 Digital cellular telecommunication system (Phase 2 +); General Packet Radio Service (GPRS); Mobile Station (MS)–Base Station System (BSS) interface; Radio Link Control/Medium Access Control (RLC/MAC) protocol (GSM 04.60 version 6.3.1 Release 1997)", European Telecommunication Standard, 1999, pp. 1, 26, 27, 52, 53, 71–75, 87–95, XP002139283.

* cited by examiner

Primary Examiner—Christine T. Tu

(57) ABSTRACT

According to exemplary embodiments of the present invention, each transmitted data block is assigned the current value of NextPollToBeSent. When an acknowledgement message is received, a valid ACK/NACK is contained for all data blocks that have been assigned index NextAckDue. This technique of tying data blocks to a particular polling request copes well when multiple retransmissions of a data block are necessary, and when polling requests/acknowledgement messages are lost.

26 Claims, 5 Drawing Sheets

METHODS AND SYSTEMS FOR AVOIDING UNNECESSARY RETRANSMISSIONS ASSOCIATED WITH AUTOMATIC RETRANSMISSION QUERY SCHEMES IN RADIOCOMMUNICATION SYSTEMS

BACKGROUND

The present invention relates to data communication systems. In particular, the invention relates to a method and system for reliable data transmission in radiocommunication systems which provide for automatic retransmission of incorrectly received data blocks.

In the last decade, progress in radio and VLSI technology has fostered widespread use of radio communications in consumer applications. Portable devices, such as mobile radios, cellular phones, and the like, can now be produced having acceptable cost, size and power consumption for the consumer market.

Although wireless technology is today focused mainly on voice communications (e.g., with respect to handheld cell phones), this field will likely expand in the near future to provide greater information flow to and from various types of portable devices and fixed devices. More specifically, it is likely that further advances in technology will provide very inexpensive radio equipment, which can easily be integrated into many devices. This will allow for further reduction of the number of cables currently used. For instance, radio communication can eliminate or reduce the number of cables used to connect master devices with their respective peripherals.

In order to obtain a link with high data integrity, communication systems apply retransmission schemes to retransmit data blocks that have been received incorrectly by the receiving unit. Numerous automatic retransmission request (ARQ) schemes have been studied in the past; see, for example, the book "Data Networks" by Bertsekas and Gallager, published by Prentice-Hall, Inc., 1992, ISBN 0-201674-5.

In principle, there are three types of ARQ schemes from which others are derived: the stop-and-wait, the go-back-N, and the selective-repeat ARQ schemes. In the stop-and-wait scheme the next block is only transmitted if the previous segment has been acknowledged. In the go-back-N scheme, N blocks can be sent before the first segment is checked to ensure correct reception. If not, all N segments are retransmitted irrespective of whether they were correctly received or not. In the selective-repeat ARQ scheme, only the segment that failed is retransmitted and the receiver can request specific segments to be retransmitted. For practical reasons, the selective-repeat scheme is usually combined with a go-back-N scheme. The go-back-N and selective-repeat schemes can be optimized if the round-trip delay over the link is known.

The round-trip delay can become quite large in some implementations, for example complex radiocommunication architectures. Add to this the possibility of occasional poor link quality, resulting in high block error rates, and the result is a set of conditions for which it has proven difficult to optimize retransmission schemes in radiocommunication systems.

Consider the following example as illustrated in FIG. 1. During a packet data transfer between a sender 2, e.g., a radio base station in a radiocommunication system, and a receiver 4, e.g., a terminal device in the radiocommunication system, the sender 2 sends data blocks, e.g., in packets A and B, to the receiver 4. The sender 2 also occasionally polls the receiver 4 for an acknowledgement message, e.g., along with packet C. In the response 6 from the receiver 4, some data blocks will be successfully acknowledged (ACKed) in this message, while other data blocks will be negatively acknowledged (NACKed). The sender 2 will retransmit all NACKed blocks. However, there may be a long delay between the time when the sender 2 transmits a polling request and when it receives the corresponding acknowledgement message 6. In fact, if the delay is sufficiently long, the sender 2 may transmit several more polling requests, e.g., polling request 8, before the original acknowledgement message 6 is received.

This has several adverse implications for conventional ARQ schemes. For example, if a data block is lost, the receiver 4 will then receive several polling requests from the sender 2 before it actually receives a retransmission of that block. Therefore, when replying to each polling request, the receiver 4 will NACK the same data block in each acknowledgement message. Each missing data block may therefore be NACKed in several different acknowledgement messages. As a result, it becomes difficult at the sender's side to decide if an NACKed data block should be retransmitted or not. Those skilled in the art will appreciate that it would be an inefficient utilization of communication resources to retransmit an erroneously received data block several times merely because of a lengthy delay between the transmission of a polling request and the receipt of a corresponding acknowledgement message.

Accordingly, it would be desirable to provide radiocommunication systems and methods with enhanced ARQ schemes which avoid these problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

The present invention overcomes the limitations of conventional ARQ schemes by providing an automatic retransmission protocol which links each data block to one polling request in the sender. The acknowledgement message received in reply from the receiver will contain a valid ACK/NACK for that data block. NACKs received in other acknowledgement messages for the same data block can then be ignored by the sender, i.e., redundant retransmissions will not be performed.

More specifically, according to an exemplary embodiment of the present invention, tracking variables NextPollToBeSent and NextAckDue are assigned the same value at the beginning of a packet data transfer. As each polling request is sent, the value of NextPollToBeSent is incremented. As each acknowledgement message is received, the value of NextAckDue is incremented. When a data block is sent, it is assigned the current value of variable NextPollToBeSent. This identifies the next polling request to be sent. The acknowledgement message received in reply will contain a valid ACK/NACK for this block.

The above features and advantages of the invention will be more apparent and additional features and advantages of the invention will be appreciated from the following detailed description of the invention made with reference to the drawings.

BRIEF DESCRIPTION OF THE DRAWINGS

The invention will now be described with reference to the following figures, in which.

DETAILED DESCRIPTION

The following exemplary embodiments are provided in the context of TDMA radiocommunication systems. However, those skilled in the art will appreciate that this access methodology is merely used for the purposes of illustration and that the present invention is readily applicable to all types of access methodologies including frequency division multiple access (FDMA), TDMA, code division multiple access (CDMA) and hybrids thereof and to wireline, as well as wireless, communication systems.

Moreover, operation in accordance with GSM communication systems is described in European Telecommunication Standard Institute (ETSI) documents ETS 300 573, ETS 300 574 and ETS 300 578, which are hereby incorporated by reference. Therefore, the operation of the Global System for Mobilecommunication (GSM) system in conjunction with the proposed Generalized Packet Radio System (GPRS) optimization for packet data is only described herein to the extent necessary for providing context to the present invention. Although, the present invention is described in terms of exemplary embodiments in a GSM/GPRS system, those skilled in the art will appreciate that the present invention could be used in a wide variety of other digital communication systems, such as those based on wideband CDMA, wireless ATM, wireline systems, etc.

Figure 1:
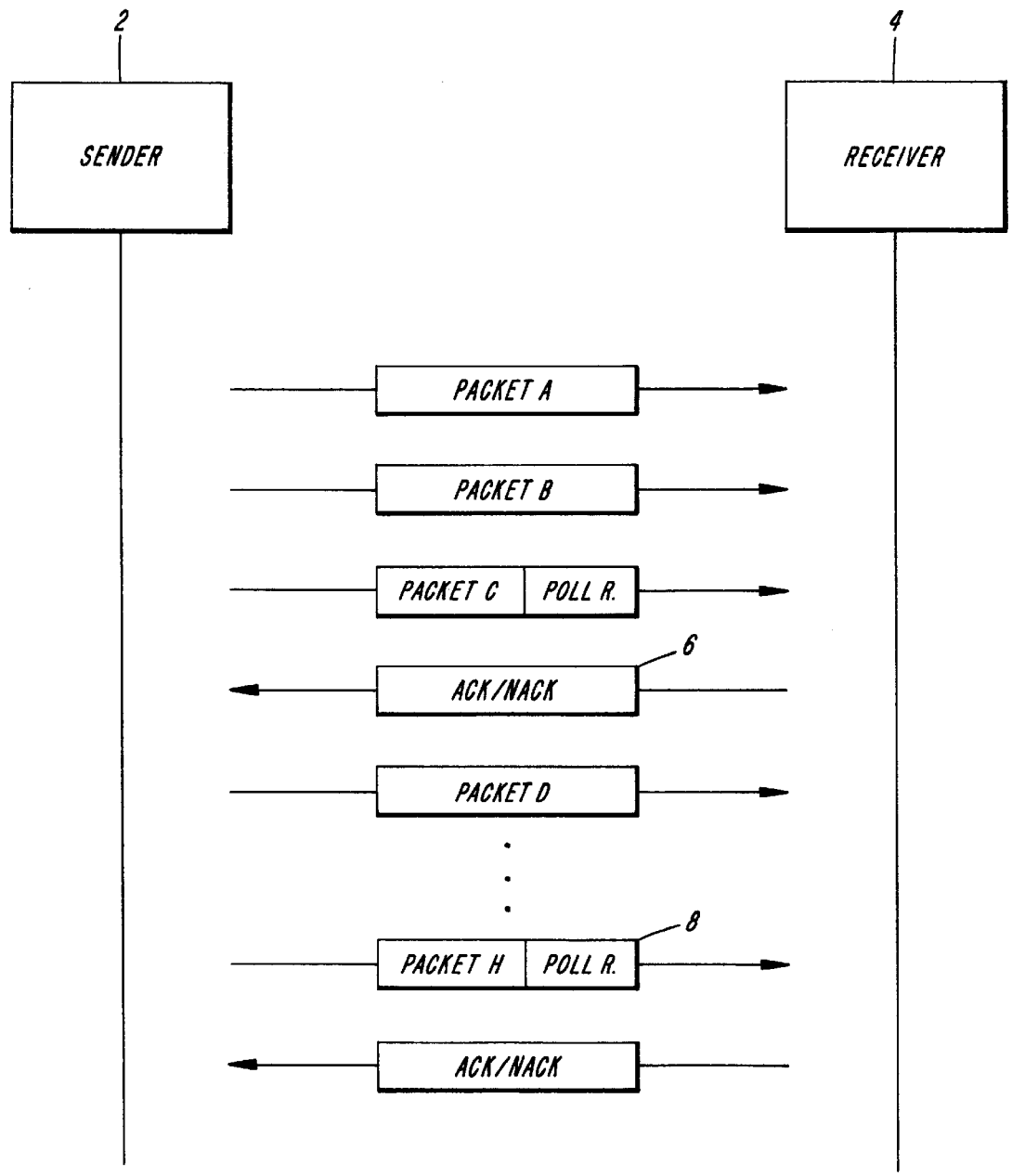
FIG. 1 is a block diagram illustrating an exemplary ARQ technique.
Figure 2:
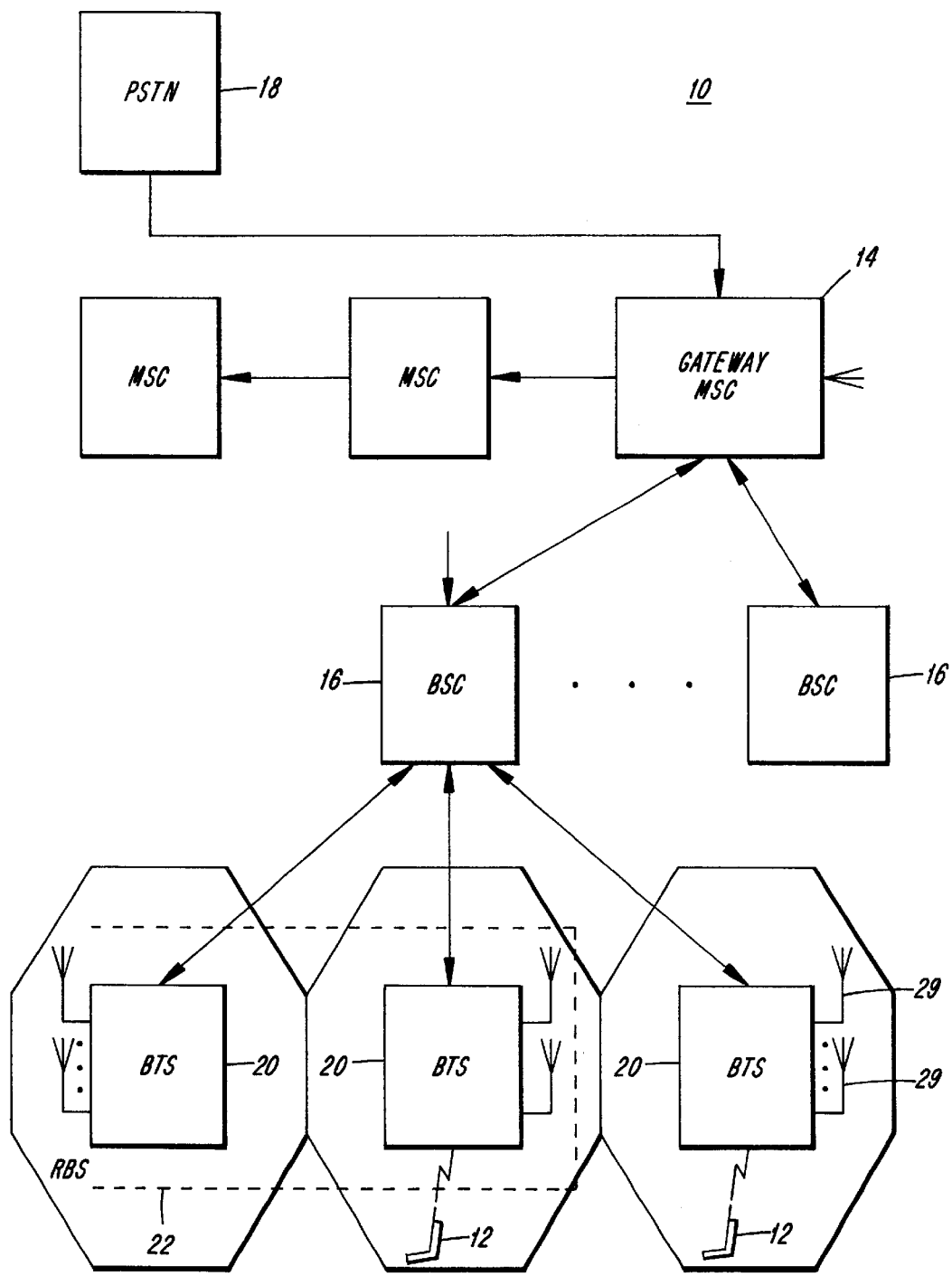
FIG. 2 is a block diagram of a GSM communication system which advantageously uses the present invention.

Referring to FIG. 2, a communication system 10 according to an exemplary GSM embodiment of the present invention is depicted. The system 10 is designed as a hierarchical network with multiple levels for managing calls. Using a set of uplink and downlink frequencies, mobile stations 12 operating within the system 10 participate in calls using time slots allocated to them on these frequencies. At an upper hierarchical level, a group of Mobile Switching Centers (MSCs) 14 are responsible for the routing of calls from an originator to a destination. In particular, these entities are responsible for setup, control and termination of calls. One of the MSCs 14, known as the gateway MSC, handles communication with a Public Switched Telephone Network (PSTN) 18, or other public and private networks.

At a lower hierarchical level, each of the MSCs 14 are connected to a group of base station controllers (BSCs) 16. Under the GSM standard, the BSC 16 communicates with a MSC 14 under a standard interface known as the A-interface, which is based on the Mobile Application Part of CCITT Signaling System No. 7.

At a still lower hierarchical level, each of the BSCs 16 controls a group of base transceiver stations (BTSs) 20. Each BTS 20 includes a number of TRXs (not shown) that use the uplink and downlink RF channels to serve a particular common geographical area, such as one or more communication cells 21. The BTSs 20 primarily provide the RF links for the transmission and reception of data bursts to and from the mobile stations 12 within their designated cell. When used to convey packet data, these channels are frequently referred to as packet data channels (PDCHs). In an exemplary embodiment, a number of BTSs 20 are incorporated into a radio base station (RBS) 22. The RBS 22 may be, for example, configured according to a family of RBS-2000 products, which products are offered by Telefonaktiebolaget L M Ericsson, the assignee of the present invention. For more details regarding exemplary mobile station 12 and RBS 22 implementations, the interested reader is referred to U.S. patent application Ser. No. 08/921,319, entitled "A Link Adaptation Method For Links using Modulation Schemes That Have Different Symbol Rates", to Magnus Frodigh et al., the disclosure of which is expressly incorporated here by reference.

An advantage of introducing a packet data protocol in cellular systems is the ability to support high data rate transmissions and at the same time achieve a flexibility and efficient utilization of the radio frequency bandwidth over the radio interface. The concept of GPRS is designed for so-called "multislot operations" where a single user is allowed to occupy more than one transmission resource.

Figure 3:
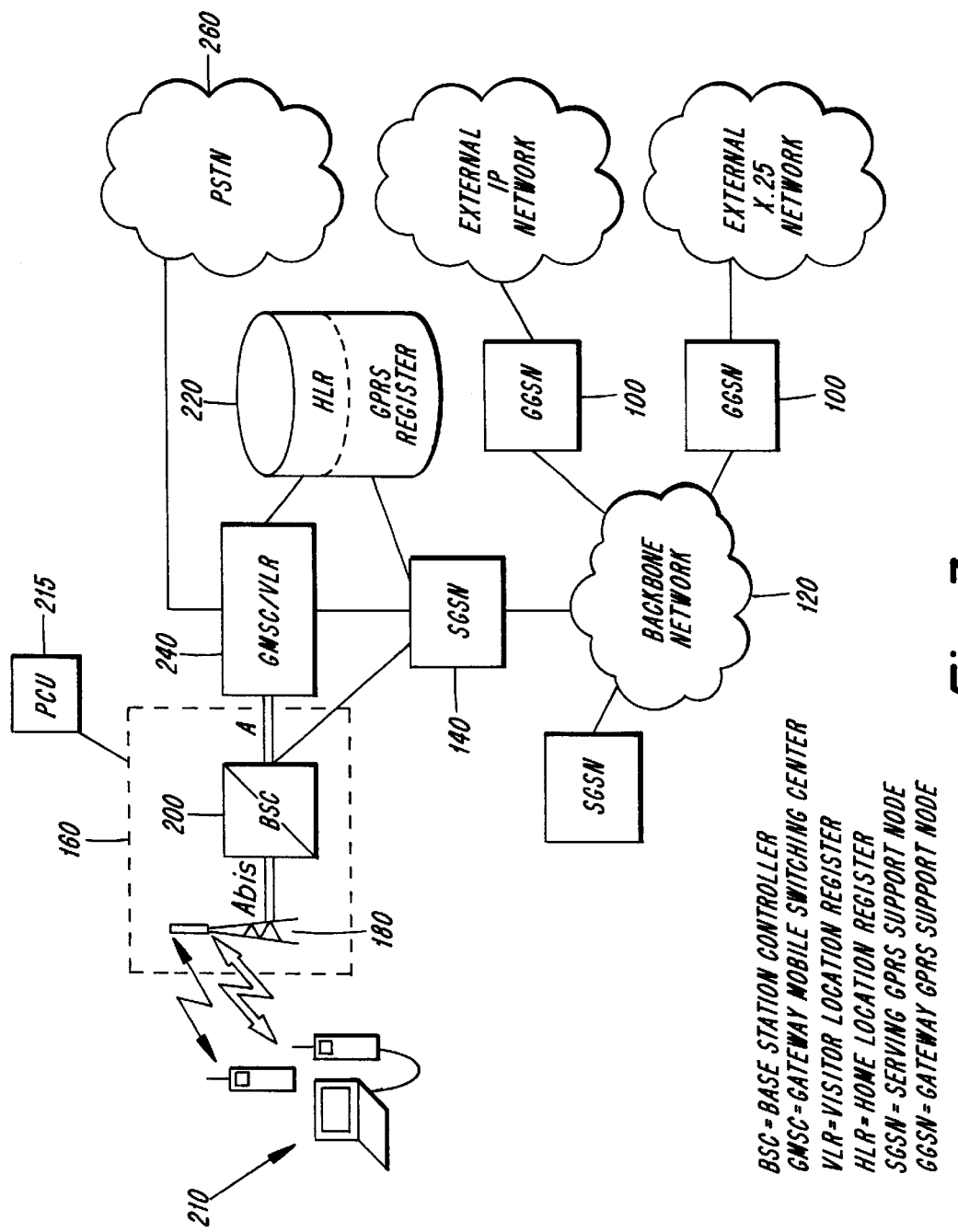
FIG. 3 is a block diagram used to describe an exemplary GPRS optimization for the GSM system of FIG. 2.

An overview of the GPRS network architecture is illustrated in FIG. 3. Since GPRS is an optimization of GSM, many of the network nodes/entities are similar to those described above with respect to FIG. 2. Information packets from external networks will enter the GPRS network at a GGSN (Gateway GPRS Service Node) 100. The packet is then routed from the GGSN via a backbone network, 120, to a SGSN (Serving GPRS Support Node) 140, that is serving the area in which the addressed GPRS mobile resides. From the SGSN 140 the packets are routed to the correct BSS (Base Station System) 160, in a dedicated GPRS transmission. The BSS includes a plurality of base transceiver stations (BTS), only one of which, BTS 180, is shown and a base station controller (BSC) 200. The interface between the BTSs and the BSCs are referred to as the A-bis interface. The BSC is a GSM specific notation and for other exemplary systems the term "radio network controller" (RNC) is used for a node having similar functionality as that of a BSC. Packets are then transmitted by the BTS 180 over the air interface to a remote unit 210 using a selected information transmission rate.

The BSS 160 also includes a packet control unit (PCU) 215, which may, for example, be co-located with either the BTS 180 or BSC 200. The PCU 215 provides an interface between the packet-switched network (e.g., external IP network, GGSN, SGSN) and the traditional circuit-switched network (MSC, BSC, BTS, etc.). The PCU 215 thus receives packet data from the SGSN 140 and switches it into the traditional circuit-switched GSM network for transmission on the downlink to remote unit 210 and receives data from the remote unit 210 and forwards packets to the SGSN 140.

A GPRS register will hold GPRS subscription data. The GPRS register may, or may not, be integrated with the HLR (Home Location Register) 220 of the GSM system. Subscriber data may be interchanged between the SGSN and the MSC/VLR 240 to ensure service interaction, such as restricted roaming. The MSC/VLR 240 also provides access to the land-line system via PSTN 260.

As mentioned above, retransmission techniques can be provided in system 10 so that a receiving entity (e.g., PCU 215 or MS 210) can request retransmission of (or redundant bits associated with) a data block from a sending entity (MS 210 or PCU 215). According to exemplary embodiments of the present invention, such retransmission techniques involve transmitting, from the sending entity a polling request to which prompts the receiving entity to identify blocks that require retransmission and acknowledgement messages, from the receiving entity, which provide this information. According to exemplary embodiments of the present invention, to keep track of polling requests and replies, the sender assigns a unique index to each polling request. The sender also assigns an index to the corresponding acknowledgement messages. This can be accomplished by, for example, employing two variables in the sending entity to keep track of polling requests and acknowledgement messages. In the examples described herein, these variables names will be used, although these names are purely illustrative:

NextPollToBeSent: This variable is an index of next polling request to be sent.

NextAckDue: This variable is an index of the next acknowledgement message due from the receiver.

Figure 4:
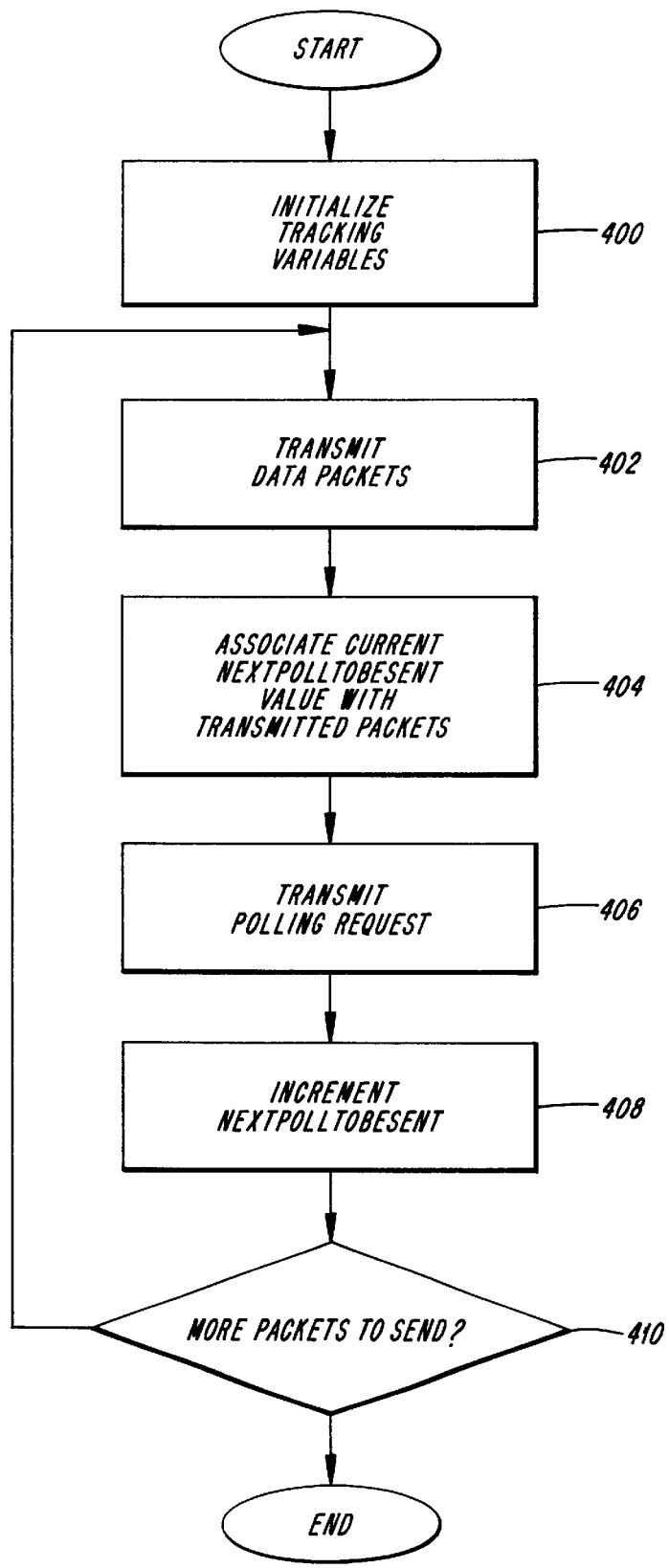
FIG. 4 is a flowchart depicting packet data transmission according to an exemplary embodiment of the present invention.

An exemplary method according to the present invention will now be described with reference to the flowchart of FIG. 4. When a packet data transfer begins, the sender has sent no polling requests and received no acknowledgement messages. Thus, the tracking variables NextPollToBeSent NextAckDue are first initialized to a predetermined value, e.g., 1, at step 400. Thus, the next (first) polling message to be sent is assigned an identifier value of 1 as is the next (first) acknowledgement message to be received. Then, one or more data blocks are transmitted at step 402. These data block(s) are associated with the current value of NextPollToBeSent, e.g., by storing each of their sequence numbers and the current value of NextPollToBeSent together in a memory unit of the sending entity, at step 404. This process continues until a polling message is transmitted by the sending entity to the receiving entity at step 406. The polling message can, for example, include two parts. The first part is a single bit in the header of a data block which indicates to the receiving entity that it should send an acknowledgement message. The second part indicates how long the receiving entity should delay before sending the acknowledgement message, e.g., in number of frames. This permits the sending entity to predict when it should receive the acknowledgement message. Subsequent to the transmission of the polling message, the tracking variable NextPollToBeSent is incremented at step 408. If more blocks are to be transmitted (step 410), the incremented value of NextPollToBeSent will be associated with those blocks.

Figure 5:
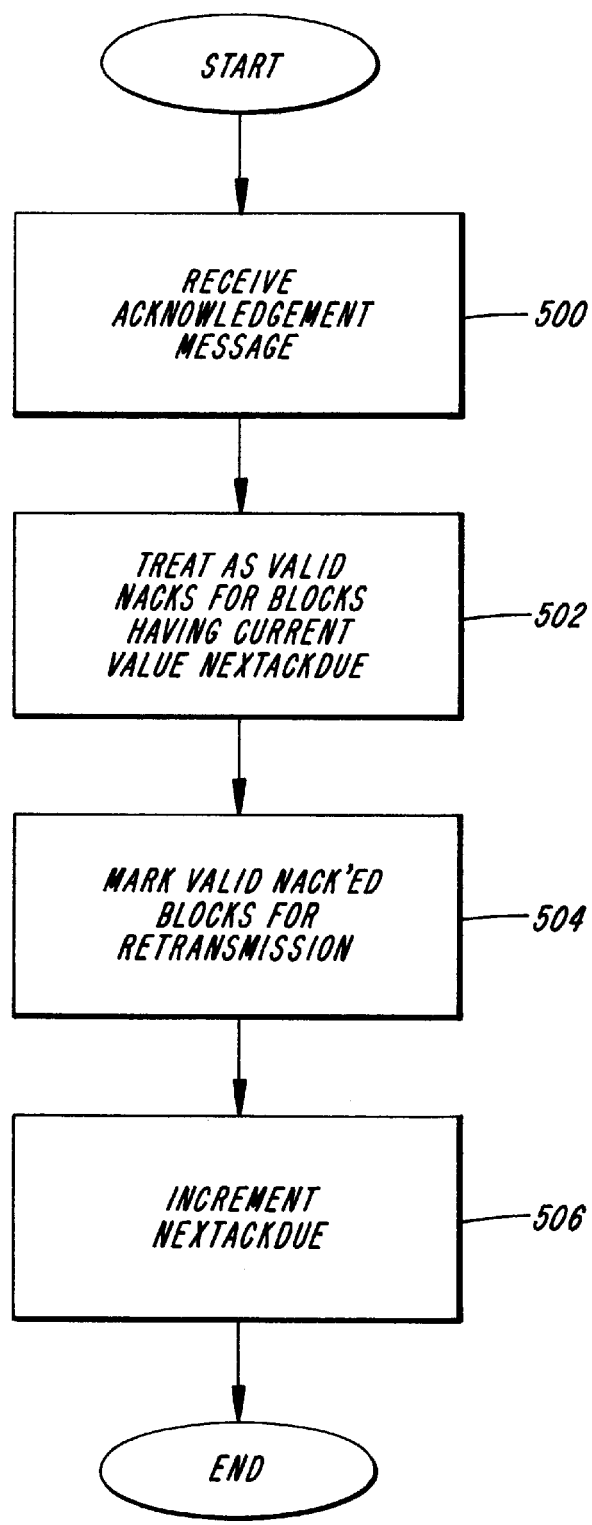
FIG. 5 is a flowchart depicting the handling of acknowledgement messages according to an exemplary embodiment of the present invention.

Turning now to FIG. 5, consider the next part of the process involving the acknowledgement message. When the receiving entity receives the polling request, it will transmit an acknowledgement message containing the reception status of a plurality of data blocks. The acknowledgement message may, for example, take the form of a bitmap wherein each bit corresponds to a particular data block and the bit value reflects the ACK or NACK status thereof. The receiving entity can decide which blocks shall be covered in its acknowledgement message. For example, the receiving entity can indicate the reception status of all blocks up to, and including, the block that contained the polling request. Alternatively, the acknowledgement message can cover all blocks up to the moment when the acknowledgement message is actually transmitted. In either case, the acknowledgement message will include the highest sequence number whose reception status is covered by the bitmap, so that the remaining bits are identified relative thereto. For example, if the acknowledgement message indicates that the sequence number 100 is the highest covered, then bit 1 in the bitmap is associated with the reception status of block 100, bit 2 in the bitmap is associated with the reception status of block 99, etc.

When the acknowledgement message is received at step 500, a valid NACK is contained for blocks that have been assigned the current NextAckDue value (step 502). Note that an ACK for a data block can be accepted from any acknowledgement message since ACKs do not result in retransmissions. If a block having the current NextAckDue value associated therewith is not ACKed (either NACKed, or not covered by the acknowledgement message for some reason), then that block is retransmitted and assigned the current value of the NextPollToBeSent variable at step 504. Retransmitting blocks that are not ACKed increases the robustness of the mechanism; if the receiver covers the wrong set of blocks in its acknowledgement message, the sender will treat blocks that should have been covered as if they were NACKed. The variable NextAckDue is then incremented at step 506 and the sending entity awaits receipt of the next acknowledgement message.

Various abnormal cases will, of course, arise. For example, an acknowledgement message or a polling message may not be received by the appropriate entity, e.g., due to poor radio channel conditions. When an expected acknowledgement message is not received by the sending entity, then all data blocks assigned index NextAckDue are assigned (NextAckDu+1) instead.

A slightly more detailed, illustrative example will now be provided to further aid in understanding the present invention. Suppose that NextPollToBeSent and NextAckDue are both assigned an initial value of 1, and that a polling request is included with every $20^{th}$ transmitted data block. Thus, the first 20 data blocks transmitted during a packet data transfer are assigned value 1 and this association is recorded in the memory of the sending entity. A polling request is then sent on block number 20, and variable NextPollToBeSent is incremented to 2. The next 20 blocks are assigned the value 2, and a second polling request is sent with block number 40. NextPollToBeSent is incremented to 3. Suppose that blocks 41–45 have been sent with index 3 before the acknowledgement message in reply to the first polling request is received.

Since NextAckDue=1, this acknowledgement message contains a valid NACK for blocks 1–20. If five of these blocks are NACKed, then they are retransmitted and assigned the current value of NextPollToBeSent, i.e. 3. After NACKed data blocks have been marked for retransmission, variable NextAckDue is incremented to 2. When a subsequent acknowledgement message is received and NextAckDue=3, that acknowledgement message will contain a valid ACK/NACK for these retransmitted blocks.

To build on this example, suppose further that the second acknowledgement message is not received when it is expected, e.g., based on the time for transmission specified in the polling message. This occurrence can be tracked by, for example, the use of a timer in the sending entity that is initiated by the transmission of a corresponding polling message. Under these circumstances, the tracking variable NextAckDue is incremented to 3, and blocks 21–40 are assigned index 3. These blocks will now be covered by the third polling message that is sent.

The foregoing has described the principles, preferred embodiments and modes of operation of the invention. However, the invention should not be construed as being limited to the particular embodiments discussed above.

For example, in some implementations, e.g., Enhanced GPRS or EGPRS, acknowledgement messages may take the form of partial bitmaps wherein the receiver only includes the receive status for a subset of the data blocks in its receive window. For such implementations, it may be preferable to treat "missing" ACKs/NACKs, i.e., blocks which have associated therewith a polling identifier that is equal to NextAckDue but for which there is no corresponding bit in the bitmap, as forthcoming rather than NACKs. That is, instead of marking those blocks for retransmission, they can instead be assigned a polling identifier value in memory that corresponds to an incremented value of NextAckDue.

Therefore, the above-described embodiments should be regarded as illustrative rather than restrictive, and it should be appreciated that variations may be made in those embodiments by workers skilled in the art without departing from the scope of the invention as defined by the following claims.

What is claimed is:

1. A method for communicating data packets in a communication system comprising the steps of:
   assigning a polling message identifier value to a polling message;
   transmitting a plurality of said data packets;
   associating said polling message identifier value with each of said plurality of data packets;
   transmitting said polling message;
   incrementing said polling message identifier value;
   transmitting subsequent data packets;
   associating said subsequent data packets with said incremented polling message identifier value;
   receiving an acknowledgement message which includes information regarding an acknowledgement status of received data packets, wherein said acknowledgement message is a bitmap that provides said acknowledgement status for at least a subset of all data packets in receive window; and
   treating as valid the acknowledgement status for said received data packets which have an associated polling message identifier value that is the same as an acknowledgment message identifier value.

2. The method of claim 1, wherein said step of associating further comprises the step of:
   storing a correspondence between said polling message identifier value and said plurality of data packets in a memory device of a sending unit.

3. The method of claim 1, wherein said communication system is a radiocommunication system.

4. The method of claim 1, wherein, for each of said received data packets, said acknowledgement status is one of acknowledged (ACK) and not acknowledged (NACK).

5. The method of claim 4, further comprising the step of:
   marking for retransmission those received data packets having a valid acknowledgement status of NACK.

6. The method of claims 5, further comprising the step of:
   incrementing said acknowledgement message identifier value.

7. The method of claim 1, wherein said acknowledgement message is a bitmap that provides said acknowledgement status for all data packets in a receive window.

8. A method for handling an acknowledgement message in a communication system in which data packets are transferred between a sender and a receiver comprising the steps of:
   receiving, at said sender, said acknowledgement message which includes information regarding an acknowledgement status of said data packets at said receiver, wherein said acknowledgement message is a bitmap that provides said acknowledgement status for at least a subset of all data packets in a receive window; and
   treating as valid the acknowledgement status for said data packets which have an associated polling message identifier value that is the same as an acknowledgement message identifier value, wherein both of said associated polling message identifier value and said acknowledgement message identifier value are stored at said sender.

9. The method of claim 8, wherein said communication system is a radiocommunication system.

10. The method of claim 8, wherein, for each of said received data packets, said acknowledgement status is one of acknowledged (ACK) and not acknowledged (NACK).

11. The method of claim 10, further comprising the step of:
    marking for retransmission those received data packets having a valid acknowledgement status of NACK.

12. The method of claim 11, further comprising the step of:
    incrementing said acknowledgement message identifier value.

13. The method of claim 8, wherein said acknowledgement message is a bitmap that provides said acknowledgement status for all data packets in a receive window.

14. A terminal method for communicating data packets in a communication system comprising:
    means for assigning a polling message identifier value to a polling message;
    means for transmitting a plurality of said data packets;
    means for associating said polling message identifier value with each of said plurality of data packets;
    means for transmitting said polling message;
    means for incrementing said polling message identifier value;
    means for transmitting subsequent data packets;
    means for associating said subsequent data packets with said incremented polling message identifier value;
    means for receiving an acknowledgement message which includes information regarding an acknowledgement status of received data packets, wherein said acknowledgement message is a bitmap that provides said acknowledgement status for at least a subset of all data packets in a receive window; and
    means for treating as valid the acknowledgement status for said received data packets which have an associated polling message identifier value that is the same as an acknowledgment message identifier value.

15. The terminal of claim 14, wherein said means for associating further comprises:
    means for storing a correspondence between said polling message identifier value and said plurality of data packets in a memory device of a sending unit.

16. The terminal of claim 14, wherein said communication system is a radiocommunication system.

17. The terminal of claim 14, wherein, for each of said received data packets, said acknowledgement status is one of acknowledged (ACK) and not acknowledged (NACK).

18. The terminal of claim 17, further comprising:
    means for marking for retransmission those received data packets having a valid acknowledgement status of NACK.

19. The terminal of claim 18, further comprising:
    means for incrementing said acknowledgement message identifier value.

20. The terminal of claim 14, wherein said acknowledgement message is a bitmap that provides said acknowledgement status for all data packets in a receive window.

21. A terminal for handling an acknowledgement message in a communication system in which data packets are transferred between a sender and a receiver comprising:

means for receiving, at said sender, said acknowledgement message which includes information regarding an acknowledgement status of said data packets at said receiver, wherein said acknowledgement message is a bitmap that provides said acknowledgement status for at least a subset of all data packets in a receive window; and means for treating as valid the acknowledgement status for said data packets which have an associated polling message identifier value that is the same as an acknowledgement message identifier value, wherein both of said associated polling message identifier value and said acknowledgement message identifier value are stored at said sender.

22. The terminal of claim 21, wherein said communication system is a radiocommunication system.

23. The terminal of claim 21, wherein, for each of said received data packets, said acknowledgement status is one of acknowledged (ACK) and not acknowledged (NACK).

24. The terminal of claim 23, further comprising:

means for marking for retransmission those received data packets having a valid acknowledgement status of NACK.

25. The terminal of claim 24, further comprising:

means for incrementing said acknowledgement message identifier value.

26. The terminal of claim 21, wherein said acknowledgement message is a bitmap that provides said acknowledgement status for all data packets in a receive window.

* * * * *